United States Patent [19]

Yamamoto et al.

[11] Patent Number: 4,897,681
[45] Date of Patent: Jan. 30, 1990

[54] EXPOSURE AMOUNT ADJUSTING DEVICE

[75] Inventors: Hiroshi Yamamoto, Kanagawa; Tadashi Arai; Akira Kurosawa, both of Saitama, all of Japan

[73] Assignees: Canon Kabushiki Kaisha; Canon Denshi Kabushiki Kaisha, both of Tokyo, Japan

[21] Appl. No.: 256,569

[22] Filed: Oct. 12, 1988

[30] Foreign Application Priority Data

| Oct. 14, 1987 | [JP] | Japan | 62-259101 |
| Oct. 14, 1987 | [JP] | Japan | 62-259102 |
| Oct. 14, 1987 | [JP] | Japan | 62-259103 |
| Oct. 14, 1987 | [JP] | Japan | 62-259104 |
| Oct. 14, 1987 | [JP] | Japan | 62-259105 |
| Oct. 14, 1987 | [JP] | Japan | 62-259106 |
| Oct. 14, 1987 | [JP] | Japan | 62-156848[U] |

[51] Int. Cl.⁴ .............................................. G03B 9/06
[52] U.S. Cl. ................................................ 354/271.1
[58] Field of Search ..................................... 354/271.1

[56] References Cited

U.S. PATENT DOCUMENTS 4,152,064  5/1979  Hashimoto et al. ................. 354/286
4,806,813  2/1989  Sumi et al. ........................... 310/254

Primary Examiner—Michael L. Gellner
Attorney, Agent, or Firm—Fitzpatrick, Cella, Harper & Scinto

[57] ABSTRACT

An exposure amount adjusting device comprises a stepping motor which serves as a drive source and includes a rotor, a stator and an exciting coil; and an exposure amount adjusting arrangement which is driven by the stepping motor. The exposure amount adjusting arrangement includes a fixed member having an aperture to give a passage to light, a positioning member and a bearing which are arranged away from the aperture, the positioning member determining the position of the stator, the bearing rotatably carrying the stator; a rotary member which has another light passing aperture and is arranged to be driven by the rotor; and light shielding blades which are swingably carried by both the fixed and rotary members and arranged to vary their aperture shielding areas according to a rotating position of the rotary member.

6 Claims, 3 Drawing Sheets

EXPOSURE AMOUNT ADJUSTING DEVICE

BACKGROUND OF THE INVENTION

1. Field of the Invention

This invention relates to an exposure amount adjusting device such as a shutter or a diaphragm device to be used for a still camera, a video camera or an interchangeable lens for a camera.

2. Description of the Related Art

An exposure amount adjusting device has been disclosed in U.S. patent applications, Ser. No. 035,453 (filed Apr. 7, 1987) and Ser. No. 122,764 (filed Nov. 19, 1987) both of which were assigned to the assignees of the present application. The exposure amount adjusting device is arranged to open and close light shielding blades with a stepping motor which serves as a drive source by rotating a rotor while having a stator in a stationary state. The stepping motor is disposed away from the position of a passage provided for a light beam.

An exposure amount adjusting device of this kind comprises a diaphragm part and a driving part. The diaphragm part includes a cam, diaphragm blades for light shielding, a rotary ring, a rotary ring retaining plate, screws, etc. The driving part includes a stator, a stator guide, an exciting coil, a magnetic rotor, a rotor gear, a base plate, a driving base plate, screws, etc.

However, these numerous components of the diaphragm part and the driving part necessitate complex assembly work which is to be performed for mounting, connecting and screwing from many directions. This has caused an increase in the number of assembly and adjustment processes and thus resulted in an increase in cost. Further, the conventional exposure amount adjusting device has been arranged to have one of the bearings of the rotor of the stepping motor disposed on the driving base plate and to have the driving base plate coupled to a cam with screws. The driving base plate has been thus arranged to serve as one of the bearings of the stepping motor. This further increases the number of components. Besides, the arrangement to couple the driving base plate to the cam makes it necessary to accurately adjust a distance between the axes of the driving gears. That arrangement further increases the number of processes for assembly and adjustment work and thus has further increased the cost of the device.

Further, in the conventional exposure amount adjusting device of this kind, the rotor of the stepping motor has been prepared as follows: A stainless shaft of it is insert-molded in a plastic magnet and, after magnetization, a pinion gear is pressure-fitted on the shaft while carrying out positioning work. However, this also has caused a further increase in the number of assembly processes as well as in the number of component parts. A further drawback of the conventional device has resided in difficulty in the position adjustment of the magnetic pole of the rotor to the pinion gear. Because of this difficulty, the pinion gear is positioned by pressure fitting at random relative to the magnetic pole of the rotor. This has necessitated accurate adjustment of the aperture of the diaphragm and thus caused a further increase in cost.

Further, in the conventional exposure amount adjusting device, the stator of the stepping motor and an iron core which serves as the magnetic path thereof are made of discrete members. Hence, it has been necessary to couple the iron core to the stator by means of a screw, which also has caused an increase in the number of parts, complexity of assembly work and a still further increase in cost.

The conventional exposure amount adjusting device is provided with an opening switch for detecting the open position of the diaphragm blades. This switch is mounted on a base, which is secured to the retainer plate of the rotary ring by heat caulking. However, since the base is secured by heat caulking with a supersonic wave or the like, the base tends to have a rattling play. The play then necessitates readjustment to prevent unstable switching position of the switch. This also has increased the number of parts and the cost of the device.

Further, there ha been provided no special means for facilitating the assembly work on the cam, the rotary ring and the diaphragm blades. Therefore, in mounting the rotary ring after the diaphragm blades has been mounted on the cam, the blades tend to move to make the rotary ring mounting work difficult.

Further, in cases where the exposure amount adjusting device of this kind is arranged to have the cam and the rotary ring coupled with each other by a bayonet method in a manner, for example, as disclosed in U.S. Pat. No. 4,152,064, a stopper is discretely arranged to prevent excessive rotation of the rotary ring. In this case, however, since the stopper is a discrete member, it not only increases the number of parts but also necessitates additional work such as screwing, positioning, etc. and thus also has resulted in a further increase in cost.

SUMMARY OF THE INVENTION

It is an object of this invention to provide an exposure amount adjusting device which is arranged to permit reduction in the number of component parts and in the number of processes of assembly work.

Other objects and features of the invention will be apparent from the following description.

DETAILED DESCRIPTION OF THE PREFERRED EMBODIMENT

Figure 1:
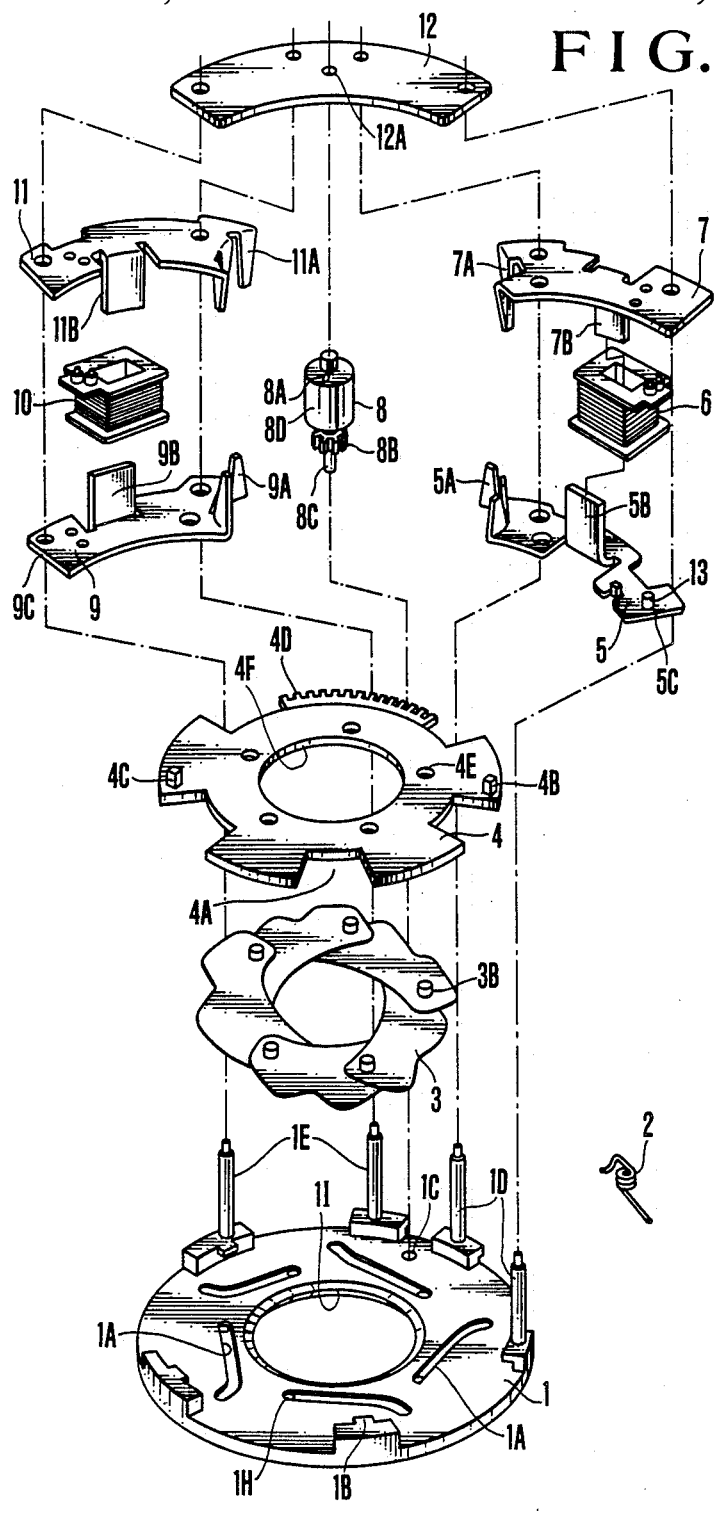
FIG. 1 is an exploded oblique view showing an embodiment of this invention.

FIG. 1 is an exploded oblique view showing an embodiment of this invention. The illustration includes a rotary cam 1; an opening switch 2; diaphragm blades 3 arranged to block light; a rotary ring 4; a stator 5; an exciting coil 6; a stator 7; a rotor 8; a stator 9; an exciting coil 10; a stator 11; and a base plate 12.

The rotary cam 1 has cam grooves 1A which are provided in the same number as the diaphragm blades 3 for positioning control over the blades 3. The cam 1 also has at least three claw parts 1B which are arranged along the periphery of the cam 1 to form a bayonet mechanism in conjunction with the rotary ring 4. A bearing 1C is arranged to rotatably carry the rotor 8 and is in the form of a shaft hole. Studs 1D are provided for mounting the stators 5 and 7 and the exciting coil 6. Studs 1E are likewise provided for mounting the stators 9 and 11 and the exciting coil 10. In other words, the studs 1D and 1E are provided for positioning. Through holes 1H are arranged to be used for positioning during assembly work. An aperture 1I is arranged to provide passage therethrough for a light beam.

Figure 5:
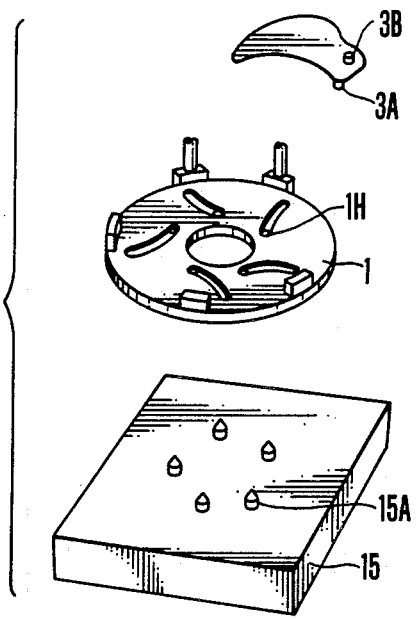
FIG. 5 is an oblique view showing by way of example an assembly process for diaphragm blades shown in FIG. 1.

In the case of this embodiment, the exposure amount adjusting device is provided with five diaphragm blades 3. Dowels 3B are connected with the hole 4E of the rotary ring 4 and are arranged to enable the blades 3 to move accordingly as the rotary ring 4 rotates. When the blades 3 move, another set of dowels 3A which are disposed on one side of the blades 3 opposite to another side having the dowels 3B, as shown in FIG. 5, move within the cam groves 1A of the cam 1. The diaphragm blades 3 thus act to open and close the diaphragm aperture which are encompassed by the blades 3.

The rotary ring 4 is provided with notches 4A which are arranged to form a bayonet mechanism in conjunction with the claw parts 1B of the cam 1 and are in a position corresponding to the claw parts 1B; and an aperture 4F which is arranged to provide a passage for a light beam. A lever 4B is arranged on the rotary ring 4 to drive the opening switch 2 which is provided for detecting the diaphragm aperture opening state of the diaphragm blades 3. When the diaphragm blades 3 are in an open state, the opening switch lever 4B pushes the opening switch 2 to detach it from an opening switch dowel 13 of the stator 5 to bring the opening switch 2 into a nonconductive state. When the rotary ring 4 turns round to stop down the aperture defining position of the diaphragm blades 3, the opening switch 2 and the opening switch dowel 13 become conductive.

The opening switch 2 is arranged to detect the open state of the blades 3 to produce an electrical signal. The switch 2 operates under the control of an open loop because a stepping motor is used as a drive source. The switch 2 prevents occurrence of any trouble when the diaphragm blades 3 fail to operate due to some reason and permits prompt confirmation of the condition of the blades 3 when the power supply of the system using this device is switched on.

Figure 2:
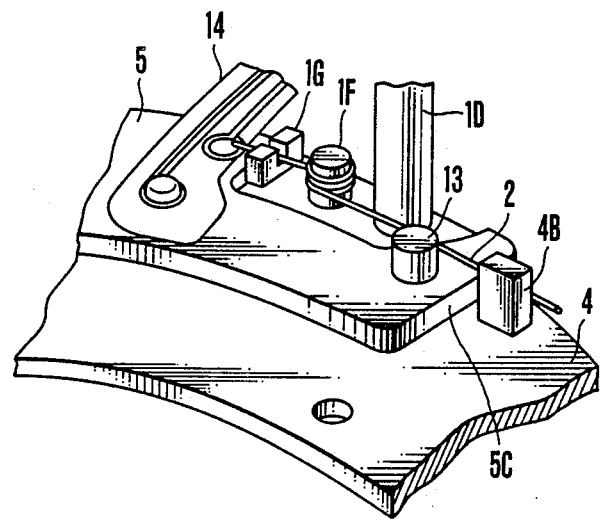
FIG. 2 is an enlarged oblique view showing by way of example an assembled state of an opening switch shown in FIG. 1.

FIG. 2 shows the opening switch 2 as in an assembled state. Referring to FIG. 2, a shaft 1F is arranged to carry the coil part of the opening switch 2. A whirl-stop member 1G is arranged to prevent the opening switch 2 from turning round. The shaft 1F and the whirl-stop member 1G are formed in one body with the cam 1, so that positional accuracy can be enhanced. The opening switch dowel 13 is secured to the stator 5 and is in an electrically conductive state. A flexible circuit board 14 is provided for supplying the signal of the opening switch 2 to the driving circuit and is soldered to the end part of the switch 2 and the stator 5.

The above stated opening switch lever 4B is arranged to prevent the rotary ring 4 from coming off from the cam 1 as another function thereof, because: Since the rotary ring 4 and the cam 1 are bayonet coupled together, the rotary ring 4 would be detached from the cam 1 if it turns round more than a given degree. With the stator 5 mounted, the end face 5C of the stator 5 serves to stop the opening switch lever 4B from moving to maintain the bayonet coupling. The rotary ring 4 has a whirl-stop dowel 4C, which is also arranged to prevent the bayonet disengagement in conjunction with the end face 9C of the stator 9. In other words, the rotary ring 4 never detaches from the cam 1 with the stators 5 and 9 mounted after the rotary ring 4 is mounted. The end faces 5C and 9C of these stators 5 and 9 thus serve as rotation limiting members for mechanically preventing the excessive rotation of the rotary ring 4.

Figure 3:
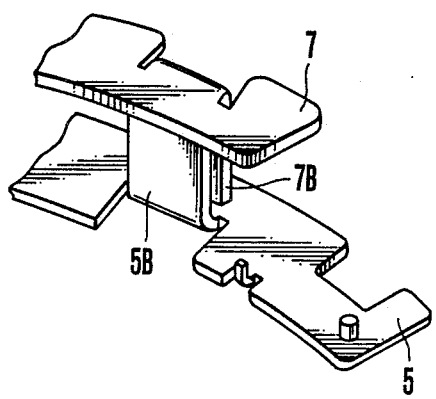
FIG. 3 is an enlarged oblique view showing the connection part of a stator shown in FIG. 1.
Figure 4:
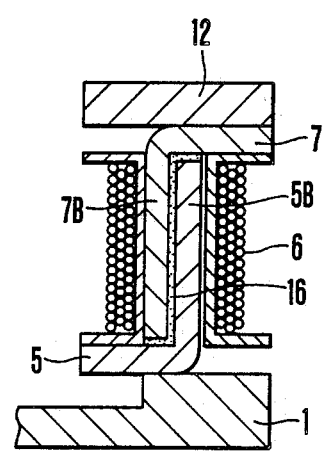
FIG. 4 is an enlarged sectional view of the same.

The stators 5, 7, 9 and 11 have comb-shaped magnetic pole parts 5A, 7A, 9A and 11A which are opposed to the rotor 8 and also have connection parts 5B, 7B, 9B and 11B which form magnetic paths. The stators 5 and 7 are magnetically connected by the connection parts 5B and 7B and thus form a phase. Stators 9 and 11 are likewise connected to form one phase. These phases have exciting coils 6 and 10 respectively. In other words, a two-phase stepping motor is used for the embodiment. FIG. 3 shows the details of the connection parts of the stators. FIG. 4 shows them in a sectional view.

The stators 5, 7, 9 and 11 are assembled with their positions determined by means of the studs 1D and 1E of the cam 1 respectively. The connection parts 5B, 7B, 9B and 11B are obtained by bending parts of the stators 5, 7, 9 and 11 by press working. It is impossible to tightly connect the two connecting parts to each other because: Since the stators 5, 7, 9 and 11 are positioned by means of the studs 1D and 1E of the cam 1, the connection parts cannot be tightly connected to each other by precisely carrying out the press working process. In view of this, the dimensions of parts are predetermined in such a way as to have a gap between connecting parts. This prevents the connecting parts from protruding and hindering correct positioning work on the stators by means of studs 1D and 1E. However, in respect of the magnetic characteristic, an air gap between the stators causes too much reluctance to degrade the characteristic of the motor. To solve this problem, therefore, the gap part is filled with a magnetic matter 16. The magnetic matter 16 is preferably some soft magnetic matter such as iron, ferrite or the like which is in a particle or liquid state or may be obtained by mixing some adhesive or the like with such soft magnetic matter.

The rotor 8 is made of a plastic magnet and is formed in one body with a shaft 8C and a pinion gear 8B. This not only enables the shaft 8C and the magnet 8D to have a high degree of concentricity with each other but also a dowel (or recess) 8A to be formed at the end face of the the magnet 8D. With this dowel 8A used as reference for magnetization, the position of the pinion gear 8B can be accurately obtained in relation to the position of the magnetic pole. In assembling the rotor 8 with the stators, the angular position of the rotary ring 4 can be determined by setting the dowel 8A in a predetermined position. Then, a necessary degree of precision is attainable without making fine adjustment of the open position of the diaphragm blades.

The exciting coils 6 and 10 are respectively interposed in between the stators 5 and 7 and between the stators 9 and 11. The winding ends of the coils 6 and 10 are allowed to pass through the holes provided in the stators 7 and 11 and to be connected either to a printed circuit board or a flexible circuit board which is not shown on the upper surface of the base plate 12. Further, as shown in FIG. 1, the base plate 12 has a bearing 12A, which rotatably carries the rotor 8. The base plate 12 is positioned by means of the studs 1D and 1E of the cam 1.

With the electro-magnetic exposure amount adjusting device arranged to have the stepping motor and the diaphragm device combined in one unit as shown in FIG. 1, when a current flows to the exciting coils 6 and 10, a repulsing and attracting forces are generated at the magnetic pole parts 5A, 7A, 9A and 11A. This causes the rotor 8 to rotate on the shaft. Like in the case of an ordinary known stepping motor, the rotating degree of the rotor 8 is determined by the switching on and off of the power supply. The power supply to the rotor 8 begins after confirmation of the state of the opening switch 2.

Figure 7:
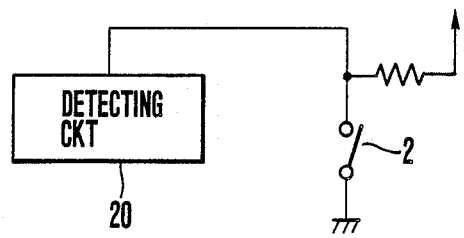
FIG. 7 shows the detecting circuit of the opening switch.

In the initial stage of the driving action on the diaphragm, the opening switch 2 turns on to supply a low level signal to the detecting circuit 20 shown in FIG. 7. If the diaphragm blades 3 are then having the aperture in a state of having been stopped down, a current is supplied to the rotor 8 in the direction of opening the diaphragm blades 3. This action continues until the opening switch 2 is turned off with a high level signal supplied to the detecting circuit 20. The current is supplied in the direction of stopping down the aperture of the diaphragm blades 3 only after the blades 3 are opened with the opening switch 2 turned off. While the rotor 8 is being turned round to a given degree in the direction of stopping down the aperture of the diaphragm blades 3, the rotary ring 4 which engages the pinion gear 8B via a rack 4D formed in one body therewith turns round accordingly. The diaphragm blades 3 are also operated by the dowels 3B accordingly as the rotary ring 4 turns round. Meanwhile, the dowels 3A of the diaphragm blades 3 act within the cam grooves 1A of the cam 1 to control the position of the blades 3. The aperture of the diaphragm is thus determined. An exposure is effected when the diaphragm aperture is determined. After that, the diaphragm blades 3 are again opened. Then, the operation of the embodiment is completed after the open state of the blades 3 is confirmed by means of the opening switch 2.

Figure 6:
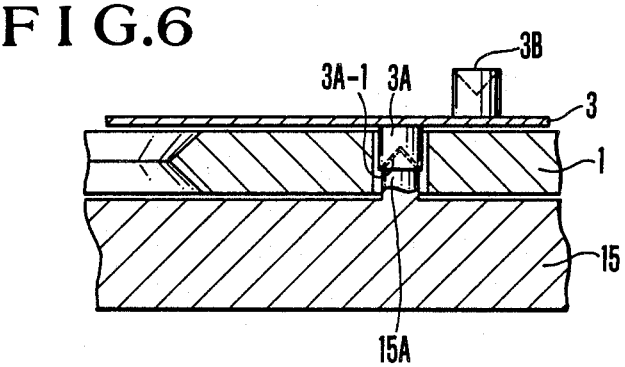
FIG. 6 is an enlarged sectional view of the same.

Procedures for assembly work on the embodiment are as follows: FIG. 5 shows a jig 15 to be used in assembling the diaphragm blades 3. The jig 15 is provided with a datum plane for receiving the cam 1 and pins 15A having their tips formed in a circular conic shape and arranged to be fit into the through holes 1H provided in the cam 1. When the cam 1 is set on the jig 15, the pins 15A which have the circular conic tips enter the through holes 1H. Then, the circular conic recesses 3A-1 (see FIG. 6) of the dowels 3A are adjusted to the circular conic pins 15A of the jig 15. By this, one positioning point is determined for the diaphragm blades 3. The diaphragm blades 3 are then moved to adjust the position of the dowels 3B to the holes 4E of the rotary ring 4 by using this point as a fulcrum. The rotary ring 4 is mounted after the diaphragm blades 3 are positioned. The claw parts 1B of the cam 1 then come to the position of the notches 4A of the rotary ring 4. After that, the cam 1 and the rotary ring 4 are removed together from the jig 15, and the rotary ring 4 is turned round. Then, the position of the notches 4A of the rotary ring 4 deviates from the claw parts 1B of the cam 1 to make the rotary ring 4 inseparable from the cam 1. Following that, the stators 5 and 9 are adjusted to the studs 1D and 1E and set in position. With the stators 5 and 9 positioned, the bayonet mechanism of the rotary ring 4 and the cam 1 becomes inseparable by virtue of the opening switch lever 4B and the whirl-stop dowel 4C.

The opening switch 2 is mounted on the cam 1 in this manner. The cam 1 has a shaft 1F and a whirl-stop member 1G formed in one body for the opening switch 2. After the opening switch 2 is mounted, the rotary ring 4 is turned round to bring the diaphragm blades 3 into an open state. Then the rotor 8 is positioned by setting the dowel 8A in position. The rack 4D of the rotary ring 4 is then engaged with the pinion gear 8B of the rotor 8. Meanwhile, the stators 7 and 11 are secured to the base plate 12, and the exciting coils 6 and 10 are fitted to the connection parts 7B and 11B, respectively, beforehand as a sub-unit. This sub-unit is set in its assembly position after the rotor 8. At that time, if air gaps left between the connection parts 5B and 7B and between the connection parts 9B and 11B present a problem in terms of the characteristic of the motor as mentioned in the foregoing, these gaps are filled with the magnetic matter 16. In that instance, that magnetic matter 16 is applied to the connection parts 5B and 9B before the sub-unit is mounted.

In the last place, the tips of the studs 1D and 1E which protrude out of the base plate 12 is secured to the plate 12 by heat welding or the like. After that, the ends of the exciting coils 6 and 10, the opening switch 2 and the stator 5 are connected to the driving circuit by means of lead wires, a printed circuit board or a flexible circuit board, etc. The assembling procedures can be carried out in given sequence without necessitating any adjustment work.

As described above, a feature of this embodiment lies in that: The provision of a plurality of positioning studs which serve as reference for mounting the driving part on the cam having cam grooves dispenses with a stator guide which has been used by the conventional device for positioning the stator. Further, a driving base plate and screws which have been used by the conventional device for coupling the diaphragm part with the driving part also become unnecessary. The embodiment thus permits much reduction in the number of required parts. In addition to this, with the studs which are erected on the cam serving as assembling reference, the stators can be more accurately positioned; the assembly work can be simplified as the parts can be assembled only from one direction; the connection parts can be lessened; and, therefore, the number of assembly processes can be lessened to a great degree. The reduction in the number of parts and the number of assembly processes results in reduction in weight and in cost.

Further, the bearing hole which is provided in the cam serves as the bearing on one side of the rotor of the stepping motor. The bearing hole obviates the necessity of a driving base plate and its mounting screws which have been used by the conventional device. This permits reduction in the number of parts and weight of the device. Further, the distance between the axis of the driving gears is arranged to be determined by the positional precision of the bearing hole. The arrangement obviates the necessity of adjustment. This also lessens the possibility of such inadequate engagement that results from the fluctuating position of driving gears obtained when the driving base plate is connected according to the conventional arrangement. Besides, since the cam is provided with the member for positioning the stators of the stepping motor, the stators can be also accurately positioned.

The arrangement of the embodiment described thus permits reduction in cost because of the reduction in the number of assembly processes and that of adjustment.

Further, in the case of this embodiment, the rotor of the stepping motor, its shaft and the pinion gear are formed in one body with a plastic magnet material. This also permits reduction in the number of parts and in the number of assembly processes for cost reduction. Further, the arrangement to have the rotor formed in one body with the pinion gear precludes the possibility of detachment of the gear and also enhances the precision in terms of the concentricity of the shaft and the rotor, so that the embodiment has an increased degree of reliability. Further, since the pole of the rotor can be adjusted to a part of the gear. The start position of the diaphragm blades can be made unvarying by setting this part in a given position relative to the gear part of the rotary ring. Therefore, this obviates the necessity of fine adjustment work on the aperture and thus permits further reduction in cost. The assembly work is further simplified by the provision of an assembly mark which is provided at a peripheral point of the rotor for facilitating the assembly work.

Further, a part of each stator of the stepping motor is bent and used as an iron core. This arrangement obviates the necessity of using some additional member as an iron core, so that the number f parts and that of assembly processes can be further reduced. Further, this not only enables the assembly work to be performed only in one direction to permit automatic assembly work but also enhances the efficiency of the stepping motor. The above stated arrangement to fill the air gap between the upper and lower stators with a soft magnetic matter such as $Fe_3O_4$ or the like prevents an increase in the reluctance of the magnetic circuit of the stator.

Further, in the embodiment described, the shaft which is provided for mounting the opening switch and the whirl-stop member are formed in one body at a part of the cam. This arrangement not only permits reduction in the number of parts but also dispenses with a heat caulking process which has been necessary for the conventional device. The dowel which serves as an electrode for the opening switch is formed at a part of the stator of the stepping motor. It obviates the necessity of an addition part to permit cost reduction. Further, unlike the conventional device, the embodiment is free from the fear of unstableness of switch positions due to a play at a switch base discretely mounted. This ensures stabilization and enhances the quality of the embodiment.

In the embodiment described, a through hole is provided in a part of each cam groove of the cam plate while a circular conic recess is provided in each dowel of the diaphragm blades on one side thereof facing the cam plate. This arrangement permits the use of the jig, which enables the rotary ring to be promptly assembled without difficulty.

Further, in the embodiment, a part of the stator of the stepping motor which is assembled with highly accurate positioning is used as a rotation limiting member for the rotary ring. This member serves also as a mechanical stopper for the maximum or minimum aperture position of the diaphragm. This member thus also permits reduction in the number of parts; obviates the necessity of adjustment work on the stopper position for the maximum or minimum aperture. Therefore, the number of assembly processes can be reduced to lower the cost of the device.

What is claimed is:

1. An exposure amount adjusting device comprising:
   a stepping motor which serves as a drive source, said stepping motor including a rotor, a stator and an exciting coil; and
   exposure amount adjusting means which is arranged to be driven by said stepping motor, said exposure amount adjusting means including:
   a fixed member having an aperture arranged to provide a passage for a light beam, said fixed member being provided with a positioning member and a bearing which are arranged away from said aperture, said positioning member determining the position of said stator, said bearing rotatably carrying said rotor,
   a rotary member which also has a light flux passing aperture, said rotary member being arranged to be driven by said rotor, and
   a plurality of light shielding blades which are swingably carried by said fixed member and said rotary member, said plurality of light shielding blades being arranged to vary light shielding areas thereof for said two apertures in response to a rotating position of said rotary member.

2. A device according to claim 1, wherein said fixed member is provided with a plurality of cam grooves; and axis portions provided on said plurality of light shielding blades are inserted in said plurality of cam grooves.

3. A device according to claim 1, wherein both said fixed member and said rotary member are formed in annular shapes with apertures in the middle parts thereof respectively; and said stepping motor is disposed in a position which is outside of said apertures and not extruding from the outside diameter of said fixed member.

4. A device according to claim 1, further comprising a base plate which rotatably carries said rotor and is positioned and carried by said positioning member at a given distance away from said fixed member.

5. A device according to claim 1, wherein said positioning member is arranged in the form of studs erected on said fixed member.

6. A device according to claim 5, wherein said bearing is arranged in the form of a shaft hole provided on said fixed member.

* * * * *

UNITED STATES PATENT AND TRADEMARK OFFICE
CERTIFICATE OF CORRECTION

PATENT NO. : 4,897,681

DATED : January 30, 1990

INVENTOR(S) : Hiroshi Yamamoto, et al.

It is certified that error appears in the above-identified patent and that said Letters Patent is hereby corrected as shown below:

COLUMN 2:

Line 13, "ha" should read --has--.

Line 16, "has" should read --have--.

COLUMN 3:

Line 20, "are" should read --is--.

COLUMN 4:

Line 48, "the" (first occurrence) should be deleted.

COLUMN 5:

Line 5, "a" should be deleted.

UNITED STATES PATENT AND TRADEMARK OFFICE
CERTIFICATE OF CORRECTION

PATENT NO. : 4,897,681  Page 2 of 2
DATED : January 30, 1990
INVENTOR(S) : Hiroshi Yamamoto, et al.

It is certified that error appears in the above-identified patent and that said Letters Patent is hereby corrected as shown below:

COLUMN 6:

Line 16, "characteristic" should read --characteristics--.

Line 22, "is" should read --are--.

COLUMN 7:

Line 24, "f" should read --of--.

Line 42, "addition" should read --additional--.

Signed and Sealed this

Thirteenth Day of August, 1991

*Attest:*

HARRY F. MANBECK, JR.

*Attesting Officer*   *Commissioner of Patents and Trademarks*